Aug. 18, 1953     F. BOVA ET AL     2,649,008
STRING INSTRUMENT INSTRUCTION CHART
Filed April 20, 1950     2 Sheets-Sheet 1
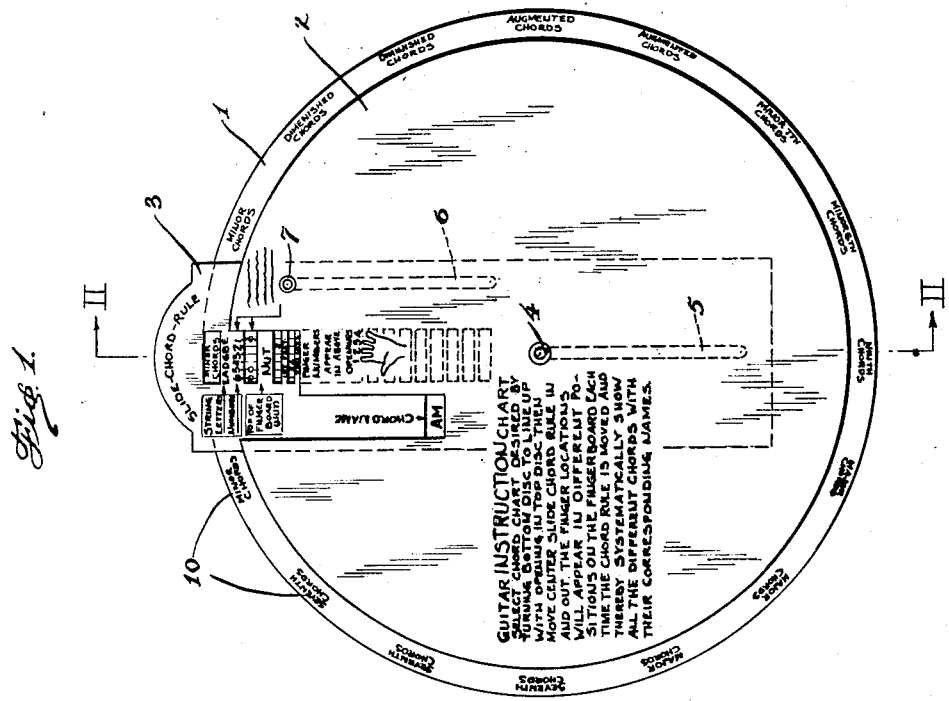
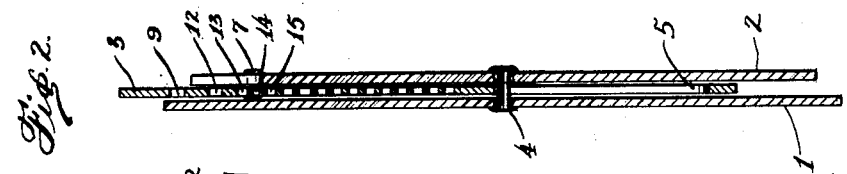
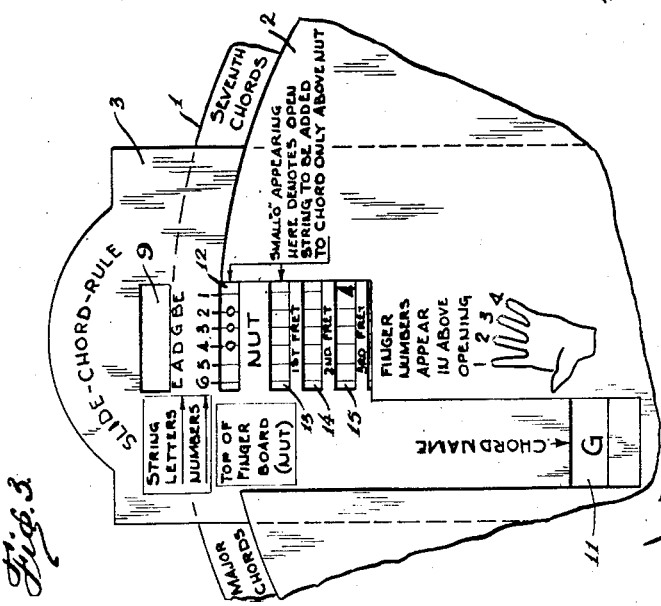
INVENTORS.
JOSEPH BOVA
FRED BOVA
BY
William J. Ruano
ATTORNEY Aug. 18, 1953 F. BOVA ET AL 2,649,008
STRING INSTRUMENT INSTRUCTION CHART
Filed April 20, 1950 2 Sheets-Sheet 2
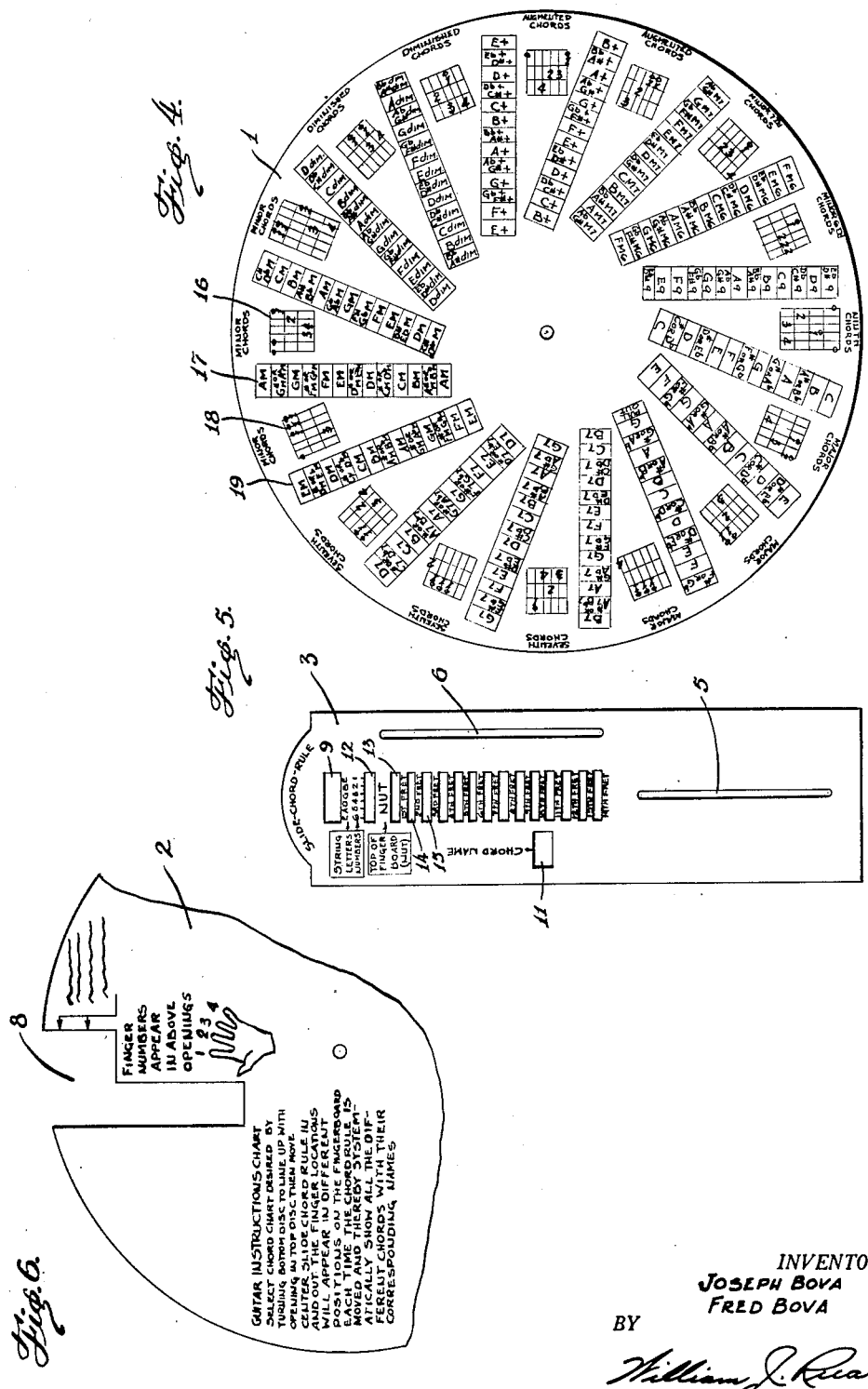
INVENTORS.
JOSEPH BOVA
FRED BOVA
BY
William J. Ricano
ATTORNEY Patented Aug. 18, 1953

2,649,008

UNITED STATES PATENT OFFICE 2,649,008

STRING INSTRUMENT INSTRUCTION CHART

Fred Bova, Pittsburgh, Pa., and Joseph Bova, New Rochelle, N. Y.

Application April 20, 1950, Serial No. 157,024

1 Claim. (Cl. 84—474)

The present invention relates to an instruction chart for string instruments, such as a guitar or ukulele, and more particularly, to an instruction chart having relatively slidable parts for quickly and easily selecting various chords to be played and for denoting the particular fingering necessary on the finger-board to play the chords.

Musical charts are well known in the art including charts to facilitate playing of a string instrument, but these, in general, are difficult to read, or in the case of charts with relatively movable parts, are somewhat difficult to manipulate as well as difficult to read with accuracy, therefore leaving much to be desired. Such charts generally are also incomplete insofar as denoting all the possible chords that may be played.

An object of the present invention is to provide a novel instruction chart having relatively slidable parts, which chart is devoid of the above-named disadvantages of commonly known charts, and which greatly facilitates instruction in the playing of a string instrument, such as a guitar or ukulele.

A more specific object of this invention is to provide a musical instruction chart with a plurality of relatively slidable parts and indices which are so arranged as to give a quick and accurate designation of any of the chords of a plurality of chord groups together with an indication of the necessary fingering on the finger-board for playing the selected chord.

Other objects and advantages of the present invention will be apparent from a study of the following description taken with the accompanying drawings wherein:

Fig. 1 is a top or plan view of a guitar instruction chart embodying the principles of the present invention;

Fig. 2 is a cross-sectional view taken along line II—II of Fig. 1;

Fig. 3 is an enlarged, fragmentary, top or plan view more clearly illustrating the construction of the slide chord rule and the manner of designation of the various chords and the fingering necessary on the finger-board for playing them;

Fig. 4 is a plan view of the bottom disk shown in Figs. 1 and 2;

Fig. 5 is a plan view of the slide chord rule shown in Figs. 1 and 2, and

Fig. 6 is a fragmentary top or plan view of the top disk shown in Figs. 1 and 2.

Referring more particularly to Figs. 1 and 2 of the drawings, numaral 1 denotes a bottom disk and numeral 2 denotes a top disk of slightly smaller diameter than the bottom disk. Sandwiched between disks 1 and 2 is a slide chord rule 3 which is so mounted as to be radially slidable with respect to the disks. The disks and slide chord rule may be made of any suitable material, such as heavy paper, cardboard, plastic, or the like, preferably of plastic material. An eyelet 4 extending through the centers of disks 1 and 2 provides a pivot to allow relative rotation of disks 1 and 2. Slide chord rule 3, as shown more clearly in Fig. 5, is provided with longitudinally extending slots 5 and 6 for guiding the rule in a radial direction with respect to the disks. Eyelet 4 cooperates with slot 5 and an eyelet 7 mounted on the top disk 2 cooperates with slot 6 so as to restrict the sliding movement of slide chord rule 3 in a radial direction.

The top disk 2 has a stepped cutout 8 as shown more clearly in Fig. 6 to provide a window whereby portions of the charts appearing on the bottom disk 1 may be viewed through suitable openings in the slide chord rule 3. As shown in Fig. 3, a window 9 is provided at the top of slide chord rule 3 and is adapted to come into registry with the names of the groups of chords 10, such as major chords, minor chords, 7th chords, diminished chords, augmented chords, etc., which names are evenly distributed about the periphery of disk 1 as shown in Fig. 1. On the slide chord rule 3 there is provided an opening 11 which is adapted to register with any of a group of chord names disposed in rectangular blocks arranged in substantially radially extending columns such as 17 and 19 in Fig. 4. For example, column 19 denotes the minor chord group and includes the various names of the chords in the minor chord group. At the same time diagram 18 will show the corresponding finger positions relative to the names as they appear through window 11 on column 19. It will be noted that while window 11 is moved radially along chord group columns, such as 17 and 19, other windows, such as 9, 12, 13, 14 and 15, disposed substantially radially of the disks, are adapted to move along finger-board charts, such as 16 and 18, respectively (see Fig. 4) which have indicia thereon to indicate the necessary fingering of the various strings in order to play the particular chord designated. For example, there are six strings denoted by letters E, A, D, G, B and E as shown in Fig. 3, numbered 6, 5, 4, 3, 2 and 1, respectively. As illustrated by the legend on disk 2 of Fig. 3, the various fingers of the left hand are denoted by numbers 1, 2, 3 and 4. Hence, by placing the number of the finger to be used at the proper location on the fingerboard chart, a specific note will be indicated. And by designating a plurality of such numbers at different fret positions observable through windows 13, 14 and 15, a complete designation in the manner of fingering the particular chord will be given. For example, in the illustration in Fig. 3, window 11 indicates the chord name as being "G," and for playing this particular chord, the 4th finger must be depressed on string No. 1 (the E string) of the 3rd fret. The smaller circles appearing through window 12 denote open strings to be added to the chord, only above the nut. It will be noted that each chord group column is in exact parallel relationship to its corresponding finger-board chart so that radial sliding of rule 3 will associate each chord of a chord group with a portion of the finger-board chart.

In operation, therefore, the slide chord rule 3 is initially pushed inwardly in a radial direction as far as possible so that its window 9 will come into registry with the names 10 of the various chord groups on disk 1, such as will appear more clearly in Fig. 1. Then the slide chord rule 3 is moved relative to disk 1 and about eyelet 4 as a center until its window 9 comes into registry with the desired chord group, such as the minor chord group or major chord group, etc. In Fig. 1, the minor chord group is selected. On looking through window 11 of rule 3, the particular chord designated of the minor chord group is A minor when the rule is in the position shown, that is, all the way in. In order to play the A minor chord, as will be noted by looking through windows 12, 13, 14 and 15, the 2nd finger must be held on string No. 2 (that is, the B string) on the first fret; whereas the 3rd and 4th fingers must be held on strings Nos. 4 and 3 (that is, strings D and G) of the second fret while strings 1, 5 and 6 are played open. Now if it should be desired to play some other chord in the minor chord group, slide chord rule 3 is pulled outwardly in a radial direction until window 11 thereof comes into registry with the particular chord in that chord group to be played. Then again, by noting the indicia appearing on the finger-board chart 16 on disk 1, as viewed through various windows 13, 14 and 15, the particular fingering necessary for playing this new chord will be indicated.

If it is desired to play a chord in a chord group other than the minor chord group, rule 3 is rotated relative to disk 1 until the desired chord of the chord group is indicated through window 11, upon which by viewing the finger numbering and fret positions through windows 13, 14 and 15, the necessary fingering for playing the particular chord is observed.

It should be noted that while the chart illustrated is indicated as being a guitar instruction chart, the same general scheme can be used for other string instruments, such as the ukulele, in which case, of course, there will be only four instead of six strings, and the fingering arrangements for given chords would be different inasmuch as ukuleles are tuned differently from guitars as is well known. However, the same general arrangement can be used, that is, window 3 of slide rule 3 could be used to select the particular chord to be played of any chord group, whereas other windows, such as 13, 14 and 15, would denote the fingering on the finger-board necessary for playing the chord.

Furthermore, if it is desired to simplify the chart by including only very commonly used chords this may be readily done by simply eliminating certain chords or chord groups.

Thus it will be seen that we have provided a highly efficient music chart which is very easy to manipulate and read and which is especially useful for denoting the necessary fingering for playing any chord in any chord group on string instruments, such as the guitar, but which chart illustrates the principles of usefulness for providing instruction for playing other musical instruments to enable the beginner to very quickly master the art of playing all the necessary chords in a relatively short time and to make playing a string instrument a relatively easy matter instead of a tedious one.

While we have illustrated and described one embodiment of our invention, it will be apparent that this is by way of illustration only, and that various changes and modifications may be made within the contemplation of our invention and within the scope of the following claim.

We claim:

A musical chart for string instruments comprising a bottom disk having a plurality of substantially radially extending chord group symbols wherein the particular chords in each chord group are indicated in columns extending substantially radially, and a plurality of substantially radially extending finger-board charts each in parallel relationship with one of said columns and with fingering designations indicated thereon for playing selected chords, a top disk having window means for associating any given chord group with its corresponding finger-board chart, a pivot for rotatably mounting said top and bottom disks, and a radially slidable rule mounted between said disks and having a slot slidably guided by said pivot, the end portions of said slot serving as limit stops for said radially slidable rule, said rule also having windows movable in registry with said window means for selecting a particular chord in any chord group and for designating on the finger-board chart the fingering necessary for playing that particular chord.

FRED BOVA.
JOSEPH BOVA.

References Cited in the file of this patent

UNITED STATES PATENTS

| Number | Name | Date |
|---|---|---|
| 1,822,457 | Furguson-Roberts | Sept. 8, 1931 |

FOREIGN PATENTS

| Number | Country | Date |
|---|---|---|
| 966,444 | France | Mar. 8, 1950 |
| 523,324 | Great Britain | July 17, 1940 |